United States Patent [19]
Makkink

[11] Patent Number: 5,385,596
[45] Date of Patent: Jan. 31, 1995

[54] TREATING OF AGRICULTURAL SOIL

[76] Inventor: Andrew E. Makkink, Doornbult, Sannieshof, Delareyville District, Transvaal Province, Sannieshof, South Africa

[21] Appl. No.: 65,112

[22] Filed: May 20, 1993

[30] Foreign Application Priority Data

May 21, 1992 [ZA] South Africa ............... 92/3709

[51] Int. Cl.⁶ .................... C05B 21/00; C05G 3/00
[52] U.S. Cl. ........................... 71/43; 71/1; 71/64.1; 111/73
[58] Field of Search ............ 71/1, 58, 61, 43, 64.1, 71/903; 111/7.1, 73

[56] References Cited

U.S. PATENT DOCUMENTS

| | | | |
|---|---|---|---|
| 2,088,869 | 8/1937 | Porter | 71/1 |
| 4,310,344 | 1/1982 | Kjelgaard et al. | 71/61 |
| 4,495,875 | 1/1985 | Makkink | 111/7 |

Primary Examiner—Ferris Lander
Attorney, Agent, or Firm—Senniger, Powers, Leavitt & Roedel

[57] ABSTRACT

Agricultural soil is acidified by applying fertilizer, especially in the form of a clear solution, having an undesirably low pH value. The invention provides for applying a liquid neutralizing reagent in the vicinity of the fertilizer, and in the same operation as applying the fertilizer. A device for treating the soil has a liquid container, a conduit and dispensing means for applying the neutralizing agent. The device can form part of a cultivating implement having fertilizer applying means, e.g. a seed planter.

5 Claims, 1 Drawing Sheet

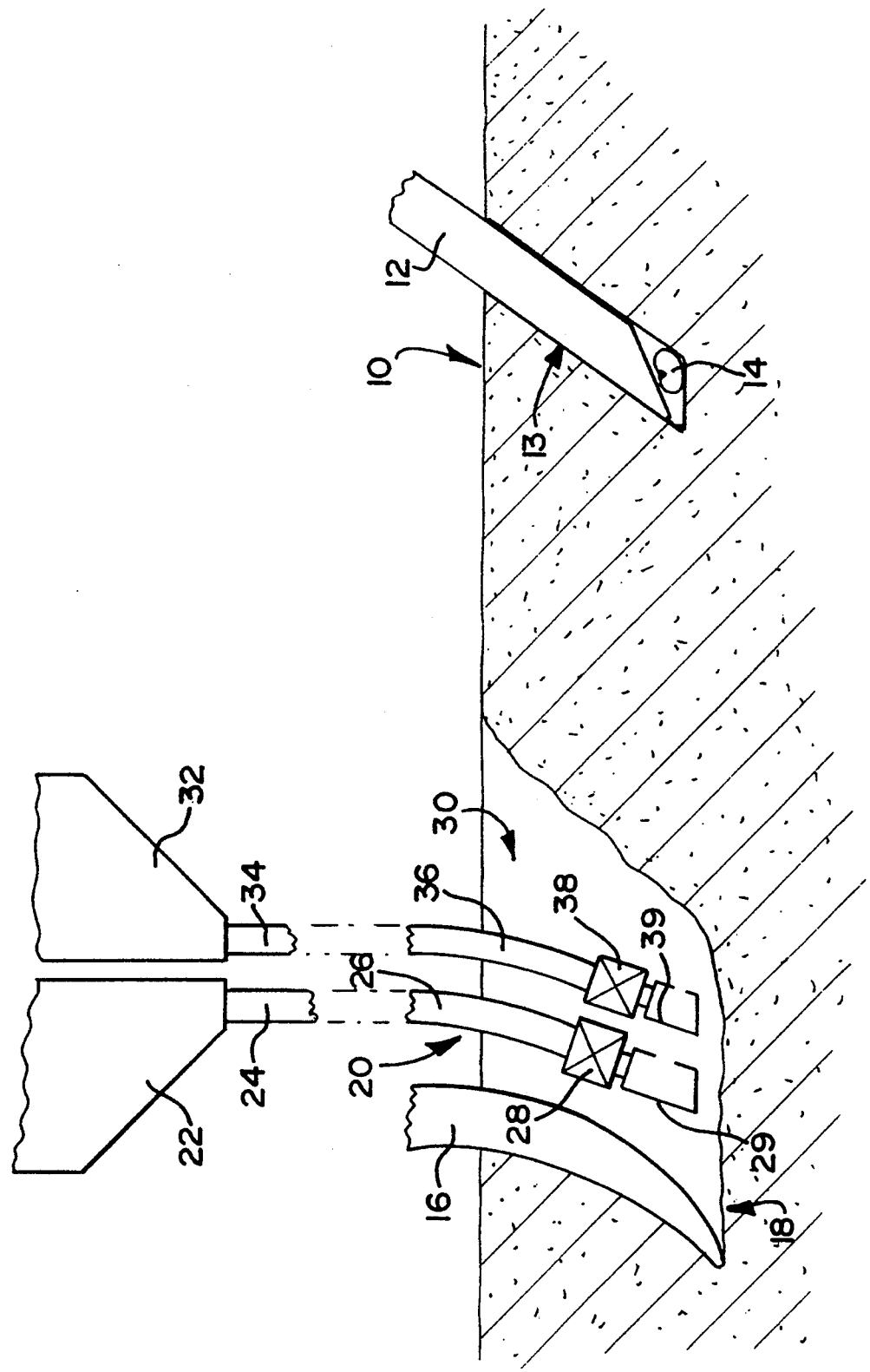

TREATING OF AGRICULTURAL SOIL

This invention relates to the treating of agricultural soil. It relates more specifically to a method of treating agricultural soil, and to a soil treating device.

It has been common practice for many years to fertilize soil by means of mass produced fertilizer. Until recently, such fertilizer was mainly in granular form.

Furthermore, it was common practice to cultivate agricultural soil relatively deeply to depths of typically 200 to 300 mm, and to upturn and mix the soil - e.g. by ploughing.

Under those conditions, the pH of the soil was corrected by working lime into the soil. The lime was ploughed in and mixed.

However, more recently, the concept of "minimum tillage" (even "no tillage") has become popular. Agricultural soil is merely loosened, and is otherwise left substantially undisturbed. Thus, under minimum or no tillage conditions, the procedure for neutralizing acid soils with lime as described above can no longer be applied as the lime cannot effectively be transported through the soil depth to the root zone of the plants.

The problem of soil acidity is being aggravated by the rapid increase in the use of liquid fertilizer at the expense of granular fertilizer. On account of substantial advantages in respect of mass production, mass handling, application into the soil, such as easier calibration, more homogeneous mixing and the like, it must be accepted that fertilizer will be applied predominantly in liquid form in future.

Liquid fertilizer, especially in the form of clear solutions, contains a relatively large amount of phosphoric acid which has escaped neutralization during production, and which releases $H^+$ cations into the soil. This greatly aggravates the problem of acidity in the soil. It is not possible fully to neutralize the liquid fertilizer during manufacture or prior to application. Such liquid fertilizer contains salts which, when neutralized, crystallize out of the solution, especially at lower temperatures. In addition, the nitrogen content of the fertilizer (nitrogen is an inherent constituent of fertilizer) is potentially available to form nitric acid. This is referred to in the trade as potential acid.

It is an object of the present invention to provide a method of, and a device for, treating agricultural soil to combat the problem of soil acidity, especially in the immediate proximity of where the plant nutrients are placed and where they will be taken up by the roots.

In accordance with a first aspect of the invention, there is provided a method of treating agricultural soil to combat acidity caused by applying fertilizer having an undesirably low pH value to such soil, the method including increasing the pH value of the fertilizer by applying a neutralizing reagent, in liquid form, at a depth and along a line in predetermined relationship to a depth and a line of application of the fertilizer, in the same operation as applying the fertilizer.

When the fertilizer is applied via a fertilizer conduit trailing a cultivating tool and an outlet of the fertilizer conduit at a predetermined depth, the fertilizer being deposited along a line and at said predetermined depth, the method may further include applying the neutralizing reagent in similar fashion via a separate neutralizing reagent conduit arranged adjacent the fertilizer conduit and an outlet of the neutralizing reagent conduit in the vicinity of the outlet of the fertilizer conduit.

The neutralizing reagent may be released at a level higher than, lower than, or substantially the same as the level of release of the fertilizer. Furthermore, the neutralizing reagent may be released on the same line as or adjacent the line of release of the fertilizer. The above configurations will be decided on the basis of the relative transport characteristics in the particular soil in question of the fertilizer and the neutralizing reagent, as well as the specific time factor, e.g. any desired time lag between releasing of the chemicals in the soil and neutralizing actually taking place.

The Applicant believes that the invention will be particularly advantageously applicable with fertilizer being in the form of liquid, especially in the form of a clear solution.

The neutralizing reagent may preferably be applied at an appropriate, pre-calculated rate, pre-calculated in accordance with effective acid (in the form $H^+$ cations) administered with the liquid fertilizer and with a predetermined allowance for potential acid associated with the liquid fertilizer. The pre-calculation may also take into account a condition of the soil relating to a pH value of the soil prior to applying the fertilizer. Thus, if such pH is lower than a preferred value, the neutralizing reagent may be administered at more than a theoretical rate.

In accordance with another aspect of the invention, broadly, there is provided a soil treating device suitable for use in treating agricultural soil to combat acidity caused by applying fertilizer having an undesirably low pH value to such soil, the device including

- a container for containing a neutralizing reagent in liquid form;
- a conduit leading from the container and having an outlet;
- dispensing means, in series with the conduit, for dispensing the neutralizing reagent at a predetermined rate in use; and
- mounting means for operatively mounting the device in association with fertilizer application means on a soil cultivating implement.

In accordance with yet a further aspect of the invention, there is provided an agricultural implement including

- at least one tine for cultivating soil;
- a fertilizer container for containing fertilizer;
- a fertilizer conduit leading from the fertilizer container along a lee-side of the tine and having a fertilizer outlet arranged to be below soil level in use;
- fertilizer dispensing means, in series with the fertilizer conduit, for dispensing fertilizer at a predetermined rate in use;
- a neutralizing reagent container for containing liquid neutralizing reagent;
- a neutralizing reagent conduit leading from the neutralizing reagent container along said lee-side of the tine and having a neutralizing reagent outlet in a predetermined relationship to and in the vicinity of said fertilizer outlet;
- neutralizing reagent dispensing means, in series with the neutralizing reagent conduit, for dispensing neutralizing reagent at a predetermined rate.

The agricultural implement may be in the form of a seed planter.

BRIEF DESCRIPTION OF THE DRAWING

The invention is now described by way of non-limiting example with reference to the accompanying drawing and to working examples. In the drawing, an agricultural implement in accordance with the invention is schematically shown in side view.

With reference to the drawing, an agricultural land is generally indicated by reference numeral 10. An agricultural implement in the form of a seed planter has a planting needle 12, which may be in the form of one of a number of seed drills arranged on a rotor and adapted to form a socket 13 in the soil and to drop a seed 14 at the bottom of the socket.

Leading the planting needle 12, there is provided a cultivating tool 16 arranged to penetrate the soil and to open a furrow 18 at a predetermined depth. The line of the cultivating tool 16 will be alongside the line in which the seeds 14 are planted such that the furrow 18 is alongside and underneath the positions of the seeds 14.

The agricultural implement comprises fertilizing means generally indicated by reference numeral 20 and comprising a liquid container 22 for containing liquid fertilizer which, in this embodiment, will be in the form of a clear solution. An outlet 24 from the container 22, which outlet is in the form of a pipe which continues as shown at 26 and extends into the soil in the lee of the cultivating tool 16. At a lower end of the conduit 26, it has a release member 29 having a rearwardly directed port. The member 29 and the port will be at a depth slightly above the bottom of the furrow 18. A dispensing mechanism 28 is provided to measure the liquid fertilizer and to ensure that it is administered at a predetermined rate.

In other embodiments, fertilizer in granular or suspension form may be applied by means of apparatus known in the field.

Similarly, there is provided a soil treating device in accordance with the invention and which is of a construction similar to the fertilizing means illustrated and described above. It has a liquid container 32, an outlet 34 leading into a conduit 36 which extend alongside the fertilizer conduit 26. At a lower end of the conduit 36, it has a similar release member 39 having a rearwardly directed port. The release member 39 is provided proximate the release member 29. A dispensing means 38 is provided to measure the neutralizing agent and to ensure that it is administered at an appropriate, pre-calculated rate.

Thus, the liquid fertilizer and the neutralizing reagent are administered simultaneously, in close proximity and in appropriate, pre-calculated mass ratio to ensure appropriate neutralizing.

It is to be appreciated that the specific relation of depositing of the liquid fertilizer and the neutralizing reagent, for example in respect of order of depositing, depth, lateral or in line depositing, may be adjusted as desired. The mechanism of transport through the soil of the respective chemicals, the relative speeds of transport, the relative importance of minimizing time delay between depositing and neutralizing, and the like, will be taken into account in this regard. For example, the situation with nutrient in the form of nitrogen will be different to the situation with nutrient in the form of phosphate.

The agricultural implement will have means trailing the agricultural tool 16 and the fertilizer and neutralizing reagent administering means 20 and 30 to close the furrow 18.

WORKING EXAMPLES

Table A sets out the composition of four typical fertilizer products as well as the pH values and specific gravities or relative densities.

| PRODUCT | 3:4:3(20) Zn | 3:2:1(22) Zn | 3:2:0(22) Zn | 3:4:0(22) Zn |
| --- | --- | --- | --- | --- |
| N % from Ammonia | ±2 | ±2 | ±2 | ±3 |
| N % from Ureum | ±4 | ±9 | ±11 | ±7 |
| Total N % | 6,0 | 11,0 | 13,2 | 9,4 |
| P % from Phos. Acid | 8,0 | 7,3 | 8,8 | 12,6 |
| K % from KCl | 6,0 | 3,7 | — | — |
| Zn from ZnSO4 | 0,25 | 0,25 | 0,25 | 0,25 |
| pH | 1,6 | 2,2 | 2,2 | 2,2 |
| Relative density | 1,31 | 1,30 | 1,30 | 1,38 |

Table B sets out, for the same products, the mass (in kg) of calcite ($CaCO_3$) required to neutralize 100 kg of the four typical fertilizers to pH values as indicated.

| PRODUCT | pH 4 | pH 5 | pH 6 | pH 7 |
| --- | --- | --- | --- | --- |
| 3:4:3(20) Zn | 5,6 | 6,2 | 8,6 | 15,7 |
| 3:2:1(22) Zn | 5,7 | 6,8 | 9,3 | 15,6 |
| 3:2:0(22) Zn | 7,1 | 8,1 | 11,2 | 18,7 |
| 3:4:0(22) Zn | 9,1 | 10,5 | 15,4 | 25,7 |

Table C sets out the volume, in litre, of an ammonium hydroxide solution containing 20% nitrogen necessary to neutralize 100 kg of the four typical fertilizers to pH values as indicated.

| PRODUCT | pH 4 | pH 5 | pH 6 | pH 7 |
| --- | --- | --- | --- | --- |
| 3:4:3(20) Zn | 7,84 | 8,68 | 12,04 | 21,98 |
| 3:2:1(22) Zn | 7,98 | 9,52 | 13,02 | 21,84 |
| 3:2:0(22) Zn | 9,94 | 11,34 | 15,68 | 26,18 |
| 3:4:0(22) Zn | 12,74 | 14,7 | 21,58 | 35,98 |

The masses/volumes of the neutralizing reagents take account only of the free acid in the form of $H^+$ cations on account of phosphoric acid in the fertilizers. The potential of the four fertilizers to lower the pH of the soil (i.e. the potential amount of acid) can be calculated by establishing the amount of reduced nitrogen in kg and multiplying that with 3.6. The answer gives the amount in kg of calcite required to neutralize the acid totally. It is currently accepted that the practical value required to neutralize acid is about half the potential value.

It is important to appreciate that the four typical fertilizers used in the examples are manufactured with phosphoric acid which is a weak acid in contrast to strong acids such as hydrochloric acid, sulphuric acid and nitric acid.

It is important to appreciate that, the optimum quantitative amount of neutralizing reagent may, and probably will, differ for different fertilizers, even though the amount of nutrient contained in the respective fertilizers is the same. Fertilizer manufacturers will thus, for each product, have to give specific instructions in respect of neutralizing.

The Applicant believes that liquid fertilizer, especially in the form of a clear solution, can effectively and accurately be administered to soil as described with reference to the figure. The Applicant further believes that the acid potential of the liquid fertilizer can equally effectively and accurately be neutralized in accordance with the invention such that the problem of acid soils can to a large extent be ameliorated and even eliminated.

In this regard, it is important to appreciate that the mere presence of plant nutrients (N,P, micro elements, and the like) is not sufficient to ensure that they are taken up by the plant roots. The plant nutrients must be in "available" form. i.e. they must be in solution. Such "availability" is directly dependent on the pH's in the specific zone of placement being correct or appropriate.

Thus, it is of vital importance to regulate the pH in the zone of fertilizer placement (the root zone). This has sadly been neglected, inter alia because of difficulties in effectively applying a neutralizing agent, costs, and the like, and where neutralizing has been practised, it has been done without due consideration of quantitative aspects and of placement. With modern cultivating methods, it is simply not possible effectively to apply the known procedures. Furthermore, as explained above, the advent of liquid fertilizer has aggravated the problem.

This invention addresses, and at least to a large extent solves the problems mentioned above in that it administers a precalculated dosage; it administers it at an appropriate position, i.e. the root zone; it conforms with modern soil working practices; and it deals with the problem of liquid fertilizer. In addition, the invention provides a user-friendly procedure; a procedure which does not require any additional working or traversing of a land; a procedure which can be effected with little additional equipment; and with equipment which is available and has been tried and tested in practice.

It is thus believed that this invention will have a direct ameliorating influence on the negative acidifying effect of fertilizer application which constitutes the major source of acid build-up in soil.

Although it is not expected that this invention will obviate the necessity to check and control pH in soil in the long term, or to replace such procedures, it is expected that this invention will drastically lengthen the intervals at which overall lime applications are needed.

It is very important to appreciate that, when liquid fertilizer is not neutralized, the negative effect of acidifying the soil (as described above) and which is particularly severe in the case of fertilizers in the form of clear solutions, drastically detracts from the very large advantages in respect of ease of handling, reducing of downtime when applying fertilizer, cost benefits, and the like, in using fertilizer in clear solution form. This invention at least greatly ameliorates the negative affect of acidifying the soil, and thus makes the advantages of clear solution fertilizers available and even more feasible.

I claim:

1. A method of fertilizing agricultural soil, including, simultaneously, in a single soil working operation,
   depositing in the soil, below a surface of soil, along a fertilizer line which is predetermined in respect of lateral position and depth, a liquid fertilizer in the form of a clear solution which fertilizer is of a kind which can exist at ambient temperatures as a clear solution without crystallization of one or more constituents thereof only at pH values lower than 4;
   depositing in the soil, below the surface of the soil, along a neutralizing reagent line which is predetermined relative to said fertilizer line in respect of lateral position and level, a flowable neutralizing reagent adapted to react with said fertilizer to form fertilizer compounds having pH values at least higher than 4,
   the method further including keeping said fertilizer and said neutralizing reagent separate until they are deposited in the soil.

2. A method as claimed in claim 1, in which said soil working operation includes mechanically drawing a soil working tool through the soil along a band encompassing said fertilizer line and said neutralizing reagent line, in which depositing said fertilizer is via a fertilizer conduit trailing said cultivating tool and having a fertilizer outlet arranged to be moved along said fertilizer line, and in which depositing said neutralizing reagent is via a neutralizing reagent conduit trailing said cultivating tool and having a neutralizing reagent outlet arranged to be moved along said neutralizing reagent.

3. A method as claimed in claim 2 in which depositing said fertilizer is at a predetermined rate by mass by metering passage of the fertilizer immediately upstream of said fertilizer outlet, and in which depositing said neutralizing reagent is at a predetermined rate by mass by metering passage of the neutralizing reagent immediately, upstream of said neutralizing reagent outlet.

4. A method as claimed in claim 1 in which depositing of said neutralizing reagent is at an appropriate, pre-calculated rate by mass, pre-calculated in accordance with effective acid (in the form of $H^+$ cations) administered with said liquid fertilizer and with a predetermined allowance for potential acid associated with said liquid fertilizer.

5. A method as claimed in claim 4 in which said pre-calculated rate of administering said neutralizing reagent takes into account a condition of the soil relating to a pH value of the soil prior to applying the fertilizer.

* * * * *